United States Patent Office 3,115,605
Patented Dec. 24, 1963

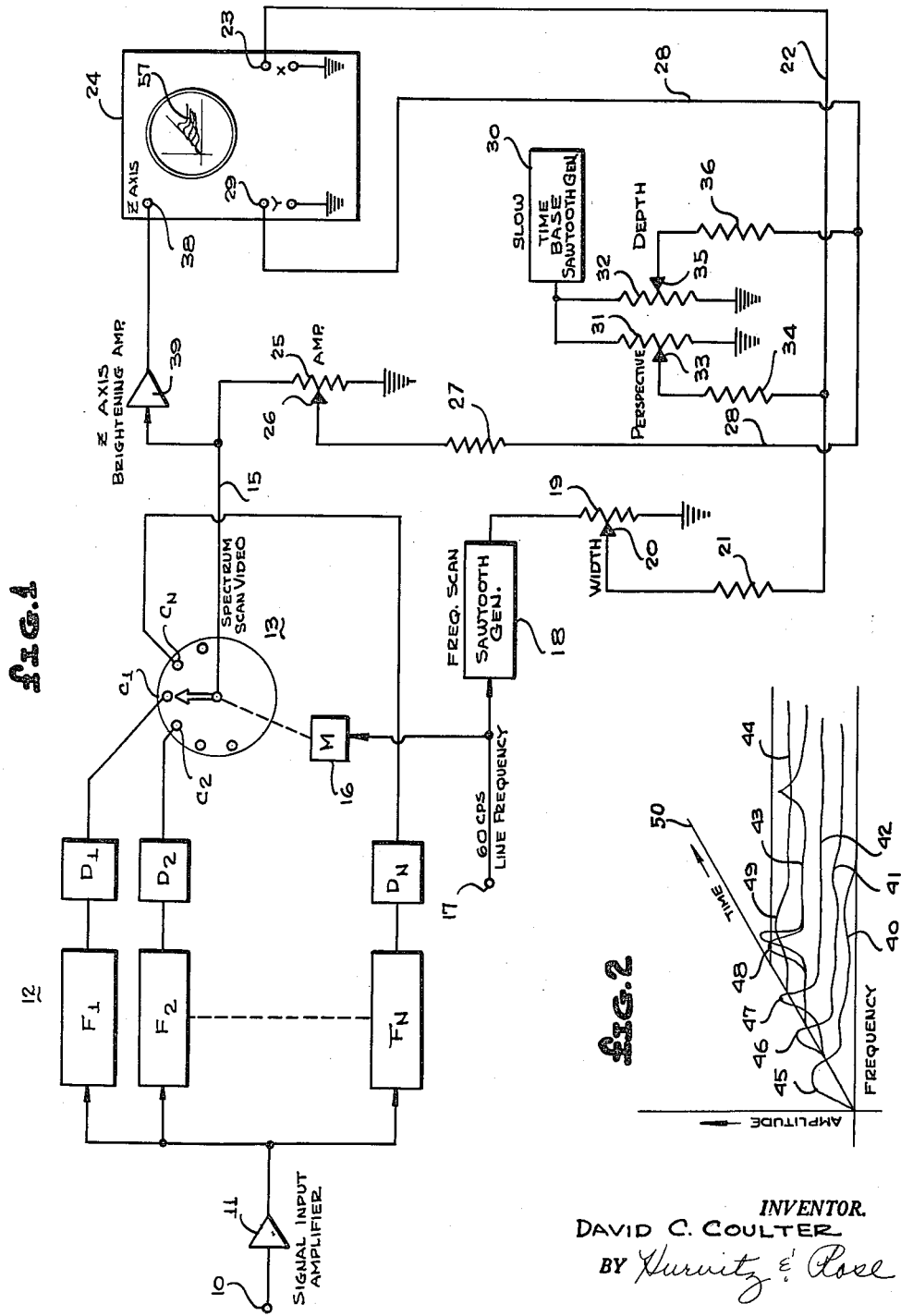

3,115,605
FREQUENCY AMPLITUDE TIME PLOTTER WITH SIMULATED THREE DIMENSIONAL DISPLAY
David C. Coulter, Springfield, Va., assignor to Melpar, Inc., Falls Church, Va., a corporation of Delaware
Filed Aug. 11, 1960, Ser. No. 48,962
6 Claims. (Cl. 324—77)

The present invention relates generally to systems for generating frequency-amplitude-time presentations, and more particularly to systems for generating frequency-amplitude-time presentations by generating conventional line spectographs, having each a frequency axis and an amplitude axis, but displacing successive ones of the presentations as a function of time at an angle to both the frequency and the amplitude axis simultaneously, whereby to give a visual impression of a three-dimensional display.

It is known in the art of speech analysis to generate spectrum displays of speech in the form of a frequency-amplitude-time presentation. One way of accomplishing this is to provide a plot of frequency against time, modulating the display in intensity in response to the amplitude of the signal. To this end a slow frequency scan may be provided, plotted in one sense on the face of a cathode ray tube indicator, accompanied by time scans in a second coordinate direction which may be quite rapid. The time scans in such case may be intensity modulated in response to the speech intensity at each instant of time.

On the other hand, a slow time scan may be provided in one coordinate direction and a relatively rapid frequency scan in a second coordinate direction, the frequency plots in such cases being amplitude modulated, in terms of the amplitudes of the frequency components generated by the scan.

The present invention concerns itself with a totally different type of scan, i.e. one in which successive scans of frequency are generated which are plotted in a first coordinate direction, amplitude of the frequency components being plotted in a second coordinate direction. Thereby, each plot generated during each frequency scan is of a type which is conventional in the field of frequency analysis, and which consist of a Fourier spectrum analysis of the speech. Successive ones of the scans, however, displaced with respect to one another on the face of the cathode ray tube at an angle to both coordinate directions. This angle may for example be approximately 30° to 45°, but the specific angle employed is largely a matter of convenience. Preferably, the angle is so selected as to provide an impression of a three-dimensional plot, i.e. successive plots resulting from successive frequency scans are caused to appear to recede rearwardly into the face of the cathode ray tube indicator, as if receding into the distance.

It is, accordingly, a broad object of the present invention to provide Fourier spectrum plots of a signal of a continuous complex wave, displaced along a time axis, and in which the display is so arranged as to provide the subjective impression of a three-dimensional plot, time being the third dimension.

It is another object of the present invention to provide a spectrum analyzer display in which successive frequency scans are plotted adjacently, but with both a vertical and a horizontal offset with respect to each preceding plot, whereby to give a three-dimensional aspect to the display.

It is another object of the invention to provide a system for displaying frequency spectra of a continually varying signal wave in such form as to provide a clear indication of the history of any frequency component present in the plots.

The above and still further objects, features and advantages of the present invention will become apparent upon consideration of the following detailed description of one specific embodiment thereof, especially when taken in conjunction with the accompanying drawings, wherein:

FIGURE 1 of the drawings is a diagram partly in schematic form and partly in functional block diagram form of a preferred embodiment of the invention, and FIGURE 2 is a frequency-amplitude-time plot, as generated by the system of FIGURE 1.

Referring now more particularly to the single figure of the accompanying drawings, the reference numeral 10 denotes a signal input terminal, to which may be applied a signal to be analyzed. In general, such signals may consist of any repetitive wave form, i.e. a wave form which changes in frequency content as a function of time. One example of such a wave form is that of human speech.

The signal applied to the terminal 10 is amplified in a signal amplifier 11 and the output of the latter is connected to a filter bank 12 consisting of a large number of filters $F1, F2 \ldots Fn$, all connected in parallel. The filters $F1-Fn$ are band pass filters which may have equal band passes, or which may have much lower band passes at the low end of a frequency band of interest and wider band passes at the high end, to provide for approximately constant percentage resolution among frequencies of interest. In either case, the array of filters is arranged to encompass the band of interest without holes, by providing that adjacent ones of the filter overlap slightly. The filters $F1-Fn$ are coupled in cascade to the detector $D1-Dn$, on a one for one basis, and the detectors $D1-Dn$ are connected on a one form basis with stationary contacts $C1$, $C2 \ldots Cn$ of a rotary scanning switch 13, comprising a rotary contact 14 which scans over the stationary contacts $C1-Cn$, in time sequence. The rotary contact 14 is rotated by a synchronous motor 16, energized from a 60 c.p.s. line supplied at terminal 17. The 60 c.p.s. voltage supplied at terminal 17 is utilized to synchronize a sawtooth generator 18, the latter initiating one scan each time the 60 c.p.s. signal passes through zero in a positively going sense.

The output of the sawtooth generator 18 is applied across a potentiometer 19, to the slider 20 of which is then supplied a sawtooth, of variable amplitude depending on the setting of the slider 20. The slider 20 is coupled via a resistance 21 to a lead 22, which in turn is connected to the horizontal or X deflection electrodes of a cathode ray tube indicator 24. The output of the scanning switch 13, as it appears on the rotating or scanning contact 14, is applied as a video signal to the lead 15, and consists of samples taken from filters $F1-Fn$ in time sequence. The signal appearing on the line 15 is applied across a potentiometer 25, to the slider 26 of which is thus applied a replica of the scanned frequency spectrums, having amplitudes determined by the setting of the slider 26. Connected in series with slider 26 is a resistance 27, connected to a lead 28, which is in turn connected to the Y or vertical input terminal 29 of the cathode ray tube indicator 24.

The system as described, accordingly, is capable of providing a frequency spectrum of conventional type, i.e. a plot of amplitude against frequency, for the signal incoming on terminal 10, and is essentially conventional per se.

A slow time base sawtooth generator 30 is provided, which increases its amplitude incrementally on a time basis such that a very small increment of increase occurs for each complete scan of the switch 13. The output of the sawtooth generator 30 is applied across two potentiometers in parallel, denominated 31 and 32. The potentiometer 31 comprises a slider 33 which supplies signal in series with an isolating resistance 34 to the lead 22. Similarly, the potentiometer 32 includes a slider 35 which supplies signal to the lead 28 via an isolating resistance 36. The potentiometers 31 and 19, together with the isolating resistances 21 and 34 constitute an adding network, so that there is applied to the lead 22 the sum of the sawtooth voltages applied across potentiometer 19 and across potentiometer 31. Similarly the potentiometer 32 and the potentiometer 25 together with the isolating resistances 27 and 36 represent an adding network which provides to the lead 28 the sums of the scan video spectrum supplied to the potentiometer 25 and the slowly varying sawtooth voltage supplied to the potentiometer 32. The net result is that the plots of amplitude against frequency are slowly deflected as a whole, both in respect to the Y and the X axis. The angle at which the slow deflection takes place is determined by the relative settings of the sliders 33 and 35. If these sliders are set equal, and assuming that potentiometers 31 and 32 are equal, the slow deflection will take place at a 45° angle. For other relative values other angles may be inserted. Visually the plot of the face of the indicator 24 then represents successive frequency spectra, each one of which is displaced slightly to the right and slightly upward with respect to the preceding one.

The cathode ray tube indicator 24 is provided with a Z axis or intensity control input electrode 38. To this input electrode is applied the scanned video spectrum available on lead 15, via a brightening amplifier 39. In consequence, each one of the frequency plots contains intensity information, i.e. the amplitude of each plot is proportional to the intensity of each plot at each point along the plot.

Reference is now had to FIGURE 2 of the accompanying drawings wherein is shown to a large scale a series of plots, such as may be generated on the face of the cathode ray tube indicator 24. In FIGURE 2, the frequency axis is horizontal and the amplitude axis is vertical. Separate plots are identified by the reference numerals 40, 41, 42, 43, and 44. Corresponding frequencies in these plots are indicated at 45, 46, 47, 48 and 49. It may then be observed that the plots as a whole appear to recede backwardly and to the right into the face of the plot, along the line 50. The slope of the line 50 is determined by the relative values of the settings of the sliders 23 and 35. It is also clear from FIGURE 2 that the amplitudes of points 45–49 of the plots are decreasing as a function of time. This decrease is evidenced by the fact that the peaks of the portions of the wave forms representative at 45, 46, 47, 48 and 49 recede downwardly from the line 50, but also by virtue of the relative intensities of the points 45, 46, 47, 48 and 49. The character of the entire display may be made such as to provide practically a solid display, wherein the separations between adjacent plots are virtually indivisible, the plot having the appearance of a three-dimensional plot in which the X axis represents frequency, the Y axis represents amplitude and the Z axis represents time.

While I have described and illustrated one specific embodiment of the present invention, it will become apparent that variations of the specific details of construction may be resorted to without departing from the true spirit and scope of the invention as defined in the appended claims.

What I claim is:

1. In a system for displaying a plot of frequency-amplitude-time in response to a time varying input signal, means for generating repetitive frequency versus amplitude Cartesian coordinate plots in response to said signal, each of said plots having frequency as one coordinate, amplitude as a further coordinate and displaying frequency versus amplitude for all frequencies within a predetermined bandwidth, the limits of said bandwidth being different for each of said plots, and means for displacing successive ones of said plots progressively in a direction making an angle greater than zero with both said coordinates simultaneously.

2. The combination according to claim 1, wherein said means for generating repetitive frequency plots includes an ordered bank of band pass filters simultaneously supplied with said input signal, and means for repetitively and orderly sampling the responses of said filters.

3. A spectrum analyzer for a time varying signal, comprising an input terminal for said signal, a bank of filters connected in parallel to said input terminal, said bank of filters consisting of band pass filters arranged in an ordered array according to pass frequency, said bank of filters together responding to all frequencies of interest in the Fourier spectrum of said time varying signal, a commutator for sampling the responses of said filters in ordered sequence, a cathode ray tube indicator having electron beam forming devices and Cartesian coordinate beam deflecting elements, means for applying the sampled responses of said filter to one of said coordinate beam deflecting elements, means for applying a rapid sawtooth deflection voltage to the other of said beam deflecting elements, means for synchronizing the sampling operations of said commutator with the said sawtooth deflection voltages, whereby said cathode ray tube displays plots of frequency versus amplitude in response to said time varying signal, and means for applying supplementary slowly varying voltages to both said deflecting elements simultaneously to displace successive ones of said displays at an angle, other than zero, to both axes of said beam deflecting elements.

4. The combination according to claim 3 wherein said supplementary slowly varying voltages are linear with respect to time, and means for at will adjusting the relative magnitudes of said slowly varying voltages.

5. A spectrum analyzer for a time varying signal, comprising an input terminal for said signal, a bank of filters connected in parallel to said input terminal, said bank of filters consisting of band pass filters arranged in an ordered array according to pass frequency, said bank of filters together responding to all frequencies of interest in the Fourier spectrum of said time varying signal, means for sampling the responses of said filters in ordered sequence, a Cartesian coordinate display having X and Y input axes responsive to signal amplitudes applied thereto, means for applying the sampled responses of said filter to one of said input axes, means for applying a rapid sawtooth signal to the other of said input axes, means for synchronizing the sampling operations of said means for sampling with the sawtooth signal, whereby said display illustrates plots of frequency versus amplitude in response to said time varying signal, and means for applying supplementary slowly varying signals to both said input axes simultaneously to displace successive ones of said plots at an angle, other than zero, to both of said axes.

6. The analyzer of claim 5 including means for varying the intensity of said plots in response to the amplitude of the response deriving from said means for sampling.

References Cited in the file of this patent

UNITED STATES PATENTS

| | | |
|---|---|---|
| 2,292,045 | Burnett | Aug. 4, 1942 |
| 2,455,456 | Whittaker | Dec. 7, 1948 |
| 2,465,355 | Cook | Mar. 29, 1949 |
| 2,484,618 | Fisher | Oct. 11, 1949 |
| 2,530,693 | Green | Nov. 21, 1950 |
| 2,602,836 | Foster et al. | July 8, 1952 |
| 2,705,742 | Miller | Apr. 5, 1955 |
| 2,967,998 | Hurvitz | Jan. 10, 1961 |
| 3,029,385 | Steinbrenner et al. | Apr. 10, 1962 |

OTHER REFERENCES

"The Cathode Ray Sound Spectroscope," article in The Journal of the Acoustical Society of America, September 1949, pp. 527–537.